United States Patent [19]
Hadley

[11] Patent Number: 5,477,577
[45] Date of Patent: Dec. 26, 1995

[54] METHOD OF CONSTRUCTING FOOTWEAR HAVING A COMPOSITE SOLE WITH A MOLDED MIDSOLE AND AN OUTSOLE ADHERED THERETO

[75] Inventor: Dennis L. Hadley, West Plains, Mo.

[73] Assignee: The Florsheim Shoe Company, Chicago, Ill.

[21] Appl. No.: 248,598

[22] Filed: May 25, 1994

[51] Int. Cl.⁶ .......................... A43D 25/00; A43D 86/00
[52] U.S. Cl. ...................... 12/142 R; 12/142 RS; 12/142 T; 12/146 B; 12/146 BR; 36/17 R
[58] Field of Search .............. 12/142 R, 142 A, 12/142 E, 142 EV, 142 RS, 142 T, 146 B, 146 BR; 36/12, 14, 17 R, 17 A, 19 A

[56] References Cited

U.S. PATENT DOCUMENTS

| | | | |
|---|---|---|---|
| 1,206,914 | 12/1916 | Price | 12/142 RS |
| 2,317,880 | 4/1943 | Bingham, Jr. | 12/142 R |
| 2,559,609 | 7/1951 | Foust . | |
| 2,574,582 | 11/1951 | Rollman | 36/14 |
| 2,748,406 | 6/1956 | Stritter . | |
| 3,029,823 | 4/1962 | Zerkowitz | 36/14 |
| 3,085,294 | 4/1963 | Rosenbaum | 36/14 |
| 3,190,016 | 6/1965 | Hansjosten | 36/14 |
| 3,332,097 | 7/1967 | Rollman et al. | 12/142 RS |
| 4,703,533 | 11/1987 | Barma | 12/142 E |
| 4,793,079 | 12/1988 | Vico | 12/142 T |
| 4,876,807 | 10/1989 | Tiitola et al. | 12/142 R |

FOREIGN PATENT DOCUMENTS 2489667  3/1982  France ................. 12/146 BR

*Primary Examiner*—Steven N. Meyers
*Assistant Examiner*—Marie Denise Patterson
*Attorney, Agent, or Firm*—Rogers, Howell & Haferkamp

[57] ABSTRACT

A method for forming a composite sole to an upper of a shoe includes molding a blank midsole to an upper of a shoe while protecting the material of the upper from the heat involved in molding the midsole to the upper, and subsequently adhering an outsole having a desired traction surface to the blank midsole. The method requires less heat and less time than prior art vulcanization processes that form entire soles to footwear uppers, and also requires less equipment than prior art processes.

13 Claims, 2 Drawing Sheets

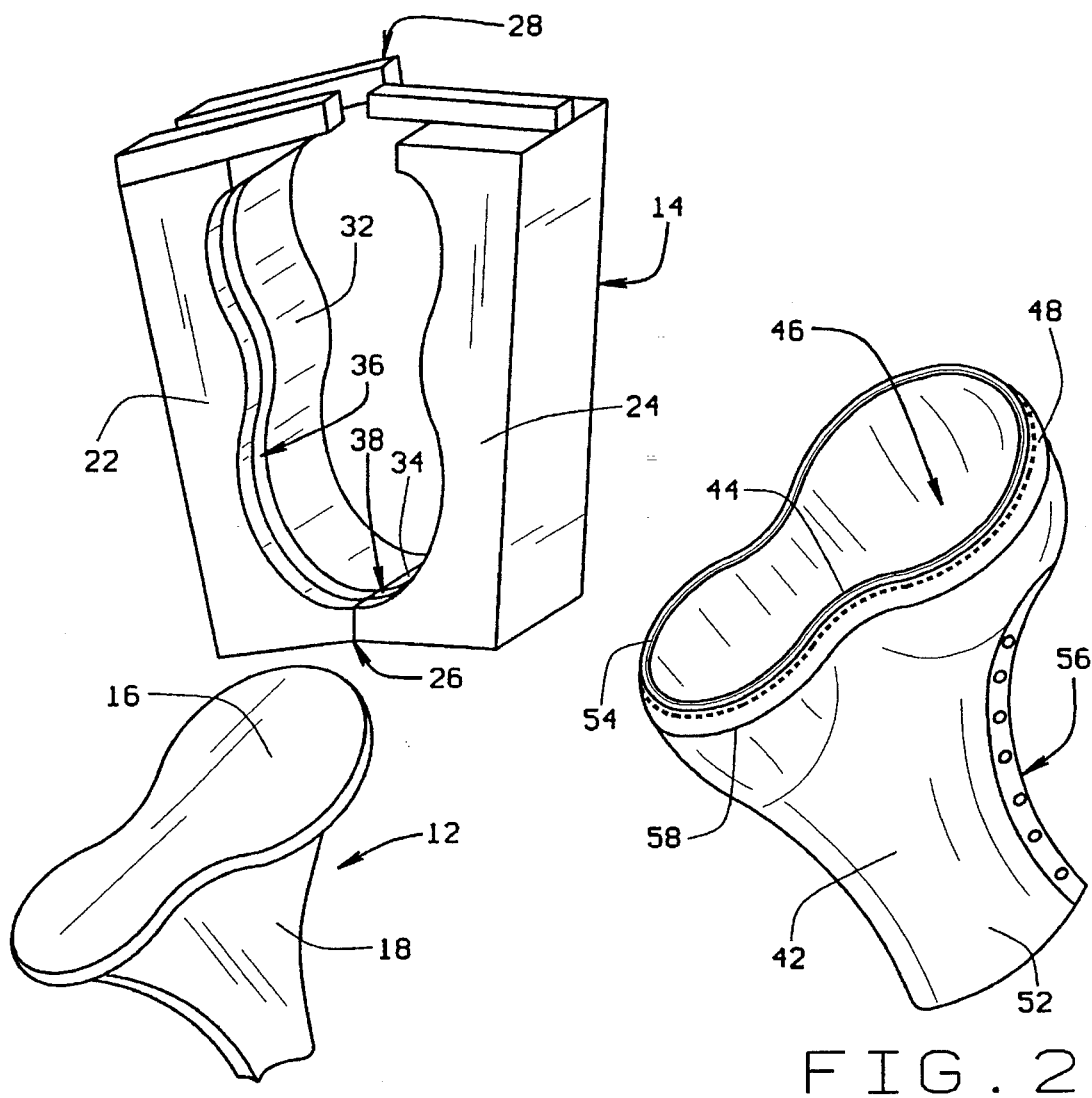
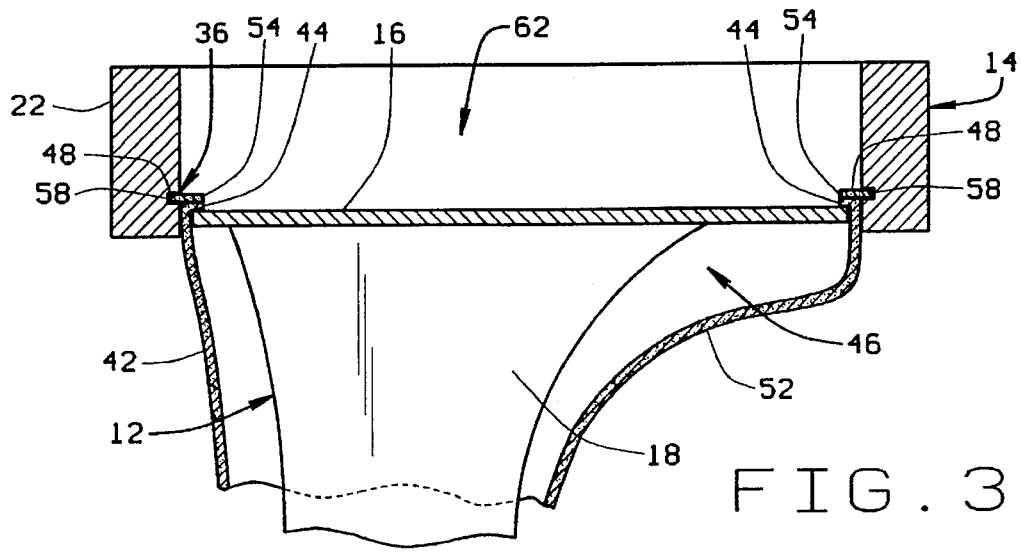

METHOD OF CONSTRUCTING FOOTWEAR HAVING A COMPOSITE SOLE WITH A MOLDED MIDSOLE AND AN OUTSOLE ADHERED THERETO

BACKGROUND OF THE INVENTION

1. Field of the Invention

The present invention pertains to a method for forming a composite sole to an upper of a shoe. More particularly, the present invention pertains to a method of molding a blank midsole to an upper of a shoe while protecting the material of the upper from the heat involved in molding the midsole to the upper, and subsequently adhering an outsole having a desired traction surface to the blank midsole.

2. Description of the Related Art

Prior art methods of constructing footwear entirely of rubber include a method where a rubber midsole is formed unitarily with a rubber upper by vulcanization, and following vulcanization of the midsole and upper an outsole is separately secured to the midsole. An example of the above described prior art method of constructing rubber footwear is disclosed in U.S. Pat. No. 4,703,533.

The above described prior art method of constructing rubber footwear cannot be employed in constructing footwear where only the sole is constructed of rubber and the upper is constructed of some other flexible material, for example leather, because the leather of the upper would be damaged by the heat of the vulcanization process. However, prior art methods are known of forming an entire shoe sole to an upper constructed of a flexible material, for example leather, without subjecting the entire upper to the heat associated with the sole forming process. According to this known method of construction, the upper is first formed with a welt sewn to a periphery of the bottommost edge of the upper. The upper and sewn welt are then fitted on a conventional last with an outer peripheral edge of the welt and the bottom peripheral portion of the upper to which the welt is sewn positioned over the periphery of the last sole forming surface. A ring mold is next attached around the last with the welt being fitted into a groove formed in the ring mold, thereby positioning an inner peripheral edge of the welt and the bottom periphery of the upper to which the welt is sewn over the sole forming surface of the last.

An insole, frequently constructed of a piece of fiberboard dimensioned to the configuration of the upper interior defined by the welt, is next inserted into the ring mold and positioned on the sole forming surface of the last. When a shankpiece is constructed into the shoe sole according to this prior art method, it is frequently adhered to the bottom surface of the insole, which is the surface facing upwardly as the insole rests on the sole forming surface of the last within the ring mold.

One or more pieces of raw rubber are next inserted into the ring mold on top of the insole, and then a vulcanizing piston is moved downwardly into the ring mold. The piston compresses the pieces of rubber between the piston face and the insole resting on the sole forming surface of the last. The piston is then heated in a process that vulcanizes the pieces of rubber into a complete sole formed on the welt and upper mounted to the last. The piston face has a configuration specifically designed to mold a particular tread surface into the bottom of the sole as it is formed. As an example of one known vulcanizing process, the vulcanizing piston is heated to a temperature of 410° F. and remains in its dwell position within the ring mold vulcanizing the rubber into a sole on the upper for a time period of 17 minutes in order to sufficiently cure the rubber.

When the vulcanizing time period has elapsed, the piston is removed from the ring mold and the ring mold is removed from around the shoe forming last. The completed shoe, having a complete sole formed to the welt stitched at the bottom periphery of the upper, is removed from the shoe forming last completing this prior art process.

This prior art method of forming a complete sole to the upper of footwear has been found to be disadvantaged in that it requires a specific set of molds for each size of the footwear being produced, and an additional multiple of molds for each size of footwear where the footwear is provided with varying tread surfaces on the footwear soles. For example, if it desired to manufacture the same piece of footwear of a specific size having various different types of tread surfaces such as slip resistant surfaces, wear resistant surfaces or electrostatic dissipating surfaces, the old method of forming a complete sole to the footwear would require a separate piston and likely a separate ring mold for each of the different tread surfaces in order to construct each of these different soles to the upper of footwear according to the old method. The costs involved in having these different pistons and molds for manufacturing footwear with differing soles contribute significantly to the overall costs of producing the footwear.

SUMMARY OF THE INVENTION

The footwear construction method of the present invention enables an upper of footwear, constructed of a flexible material that cannot in its entirety be subjected to the heat of vulcanization, to have only a midsole of a composite sole construction formed directly thereto by a vulcanization process. Following vulcanization of the midsole component of the composite sole to the footwear upper, a separate outsole having a desired traction surface is adhered to the midsole. This two step construction of first vulcanizing a blank midsole to the shoe upper and subsequently adhering an outsole having a desired traction surface to the blank midsole surface enables the use of only one ring mold and one piston in forming composite soles on the footwear, where the traction surface of the sole can selectively have a slip resistant surface, a wear resistant surface, or an electrostatic dissipating surface as well as other sole traction surfaces available. The reduction of the number of pistons and molds needed for practicing the method of the invention reduces the costs involved in producing footwear according to the method.

Furthermore, because the inventive method employs a lesser amount of raw rubber in vulcanizing only a midsole to the shoe upper, as opposed to the entire shoe sole being vulcanized to the upper according to prior art methods, the piston employed in forming the blank midsole to the shoe upper is not required to be heated to the high temperatures of the prior art process for the extended period of time of the prior art process. With a lesser amount of rubber being vulcanized and formed as the midsole on the footwear upper according to the method of the invention, the heat of vulcanization and the time period of the vulcanization process are substantially less than the heat and time period of the prior art method of vulcanizing the entire outsole to the footwear upper.

With a lesser number of pistons and ring molds needed to form a variety of sole tread surfaces on the footwear produced according to the method of the invention, and with the lesser amounts of heat and time needed in the midsole vulcanization process of the present invention, the method of the present invention provides a more economical method of producing footwear with a variety of different sole tread surfaces than has heretofore been possible with prior art methods of footwear construction.

BRIEF DESCRIPTION OF THE DRAWINGS

Further objects and features of the present invention are revealed in the following detailed description of the preferred embodiment of the invention and in the drawing figures wherein:

FIG. 1 is a schematic representation of a conventional shoe forming last and ring mold employed in practicing the footwear construction method of the present invention;

FIG. 2 is a representation of the upper of footwear with a welt affixed thereto prepared for use in the method of the present invention;

FIG. 3 is a side elevation view, in section, illustrating a preliminary step in the footwear construction method of the present invention;

DESCRIPTION OF THE PREFERRED EMBODIMENT

Figure 4:
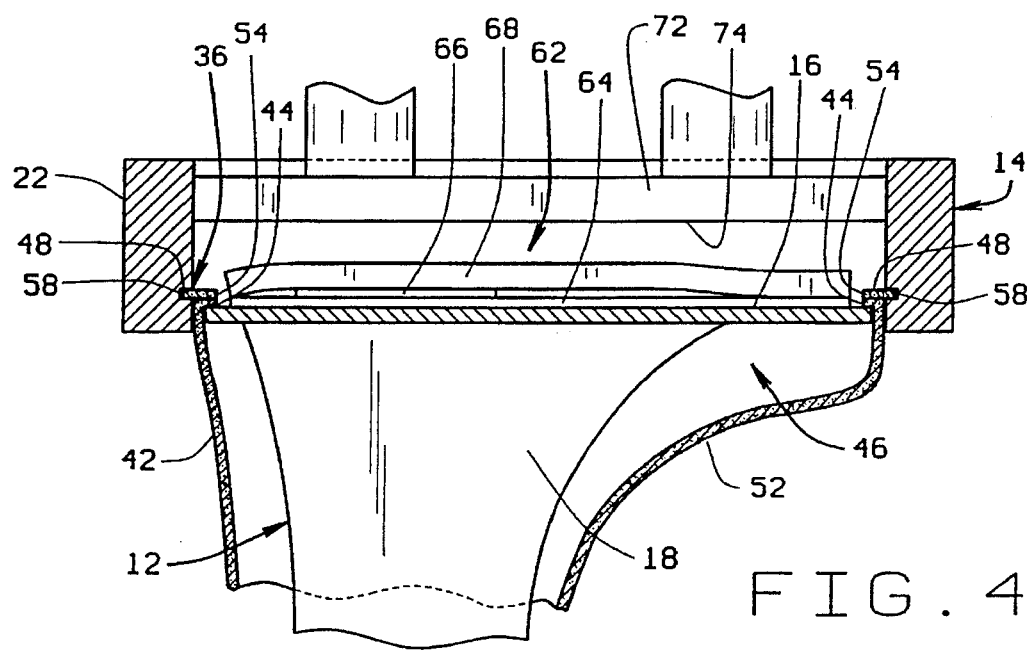
FIG. 4 is a similar view to that of FIG. 3 showing a subsequent step in the method of the invention from that of FIG. 3.
Figure 5:
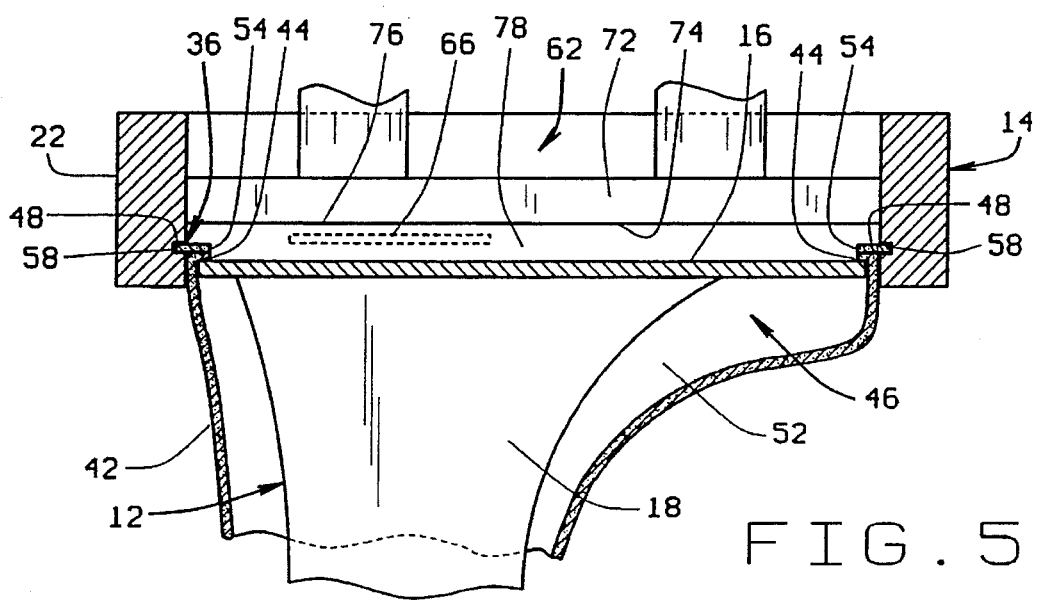
FIG. 5 is a similar view to that of FIG. 4 showing a subsequent step in the footwear construction method from that of FIG. 4.
Figure 6:
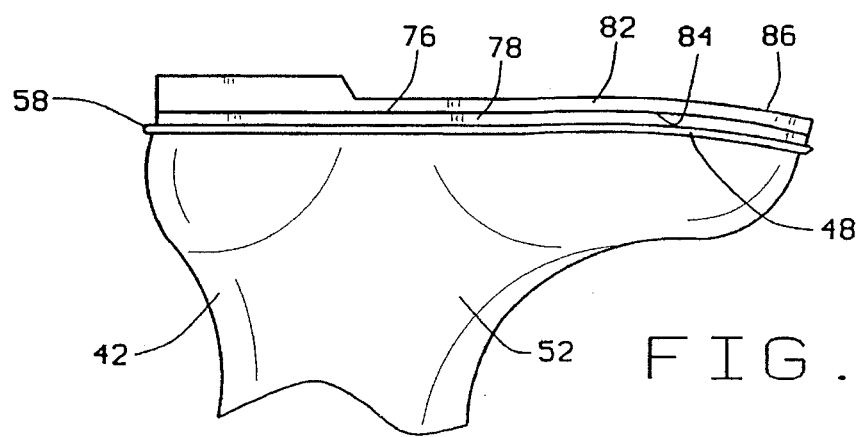
FIG. 6 is a side elevation view of footwear constructed according to the method of the present invention.

The construction of footwear having a composite sole with a molded midsole and an outsole adhered thereto according to the method of the invention employs several steps that are also employed in the prior art method of affixing an entire rubber sole to the footwear upper described earlier. These steps of the method of the invention that are the same as those of the prior art method will be pointed out in the description of the method to follow. In addition to these known steps of footwear construction, the method of the invention includes additional steps that are variations of and substitutes for steps of the prior art method of construction and still further steps that have no relation to the prior art method of construction. These novel steps of the method of the invention will also be pointed out in the description to follow.

Drawing FIGS. 1–6 depict the chronology of the steps of the method of the invention for constructing a composite sole to a footwear upper, the composite sole having a molded midsole and an outsole adhered to the midsole. The method of the invention makes use of a conventional footwear sole forming last 12 and ring mold 14 of the type that is employed in practicing the prior art method of affixing an entire sole to footwear by vulcanization. Because these two pieces of equipment are conventional and known in the art, they are described in only general terms herein. The sole forming last 12 includes a plate having a sole forming surface 16 on its top surface. The plate is supported in a conventional footwear sole vulcanizing machine (not shown) by a stem 18 secured to the underside of the plate. As seen in FIG. 1, the sole forming surface 16 of the forming last has a configuration defined by its peripheral edge that conforms to the configuration of the bottom peripheral edge of the footwear upper and footwear sole to be formed on the upper employing the forming last.

The ring mold 14 is comprised of two half block sections 22, 24 that are connected to each other at one end by a hinge or pivoting connection 26. A coupling mechanism 28 is provided at the opposite ends of the mold half sections 22, 24 from the hinge 26 to hold the half sections in closed positions around the peripheral edge of the sole forming last 12 when employing the last and ring mold both in forming the complete outsole of the prior art process and in forming the composite midsole of the method of the invention. With the coupling mechanism 28 released, the two mold half sections may be pivoted away from each other about the hinge 26 enabling attaching the ring mold around the periphery of the sole forming last 12 or removing the ring mold from around the last periphery. Opposed interior surfaces 32, 34 of the ring mold half sections 22, 24 are given specific shapes or configurations to mold a sole having a desired peripheral edge configuration to the bottom peripheral edge of a footwear upper mounted on the sole forming last 12. The two interior mold surfaces 32, 34 have grooves 36, 38 formed therein that are dimensioned to receive opposite sides of the sole forming last peripheral edge when attaching the ring mold around the sole forming last.

FIG. 2 depicts an upper 42 of footwear prepared for having a sole affixed thereto. The upper 42 prepared according to the method of the invention is substantially the same as the upper of footwear prepared for having a complete sole affixed thereto according to prior art methods of footwear construction. The upper 42 is generally constructed of a flexible material, preferably leather. However, other types of materials may be employed. A bottommost peripheral edge 44 of the upper surrounds a bottom opening that provides access to the upper interior 46. A welt 48 is affixed to the upper peripheral edge 44 and extends entirely around the peripheral edge. In the best mode of the invention, the welt 48 is secured to the peripheral edge 44 of the upper by stitching. The welt 48 is first positioned around the peripheral edge 44 of the upper overlapping the exterior surface 42 of the upper. An interior edge 54 of the welt is aligned with the bottom peripheral edge 44 of the upper and then the welt 48 is secured to the upper by a line of stitching that extends completely around the welt and upper. With the welt secured to the upper both the upper and welt are prepared for being mounted onto the sole forming last 12.

In mounting the upper 42 and affixed welt 48 to the sole forming last, the artisan holds the upper at its top edge adjacent the lacing eyelets 56 spreading open the upper in the inverted position substantially as shown in FIG. 2 and inserts the sole forming last 12 upward through the opening in the upper (not shown) between the lacing eyelets 56. The upper is then pulled downward onto the sole forming last 12 so that the bottommost peripheral edge 44 of the upper and the affixed welt 48 substantially align with the peripheral edge of the last sole forming surface 16. In conventional methods of shoe construction and in the method of the present invention, the dimensions of the upper 44, the sole forming last 12 and the ring mold 14 are all specifically designed for the construction of a particular size shoe. Therefore, when the upper 44 is pulled downward over the sole forming surface 16 of the last, the material of the upper adjacent its bottom peripheral edge 44 and the affixed welt 48 will be stretched slightly around the peripheral edge of the last sole forming surface 16.

Next, the ring mold 14 is affixed around the bottommost peripheral edge 44 of the upper and the affixed welt 48 as well as the peripheral edge of the last sole forming surface 16. In positioning the ring mold 14 around the upper and last, the artisan manipulates the welt 48 affixed to the upper peripheral edge 44 so that the welt interior edge 54 and a portion of the upper peripheral edge 44 extend over a portion of the last sole forming surface 16 adjacent its peripheral edge and an outer edge of the welt 58 is inserted into the grooves 36, 38 formed in the interior surfaces 32, 34 of the two mold half sections 22, 24. With the welt properly positioned in these grooves, the ring mold 14 is clamped shut around the upper, welt and sole forming last by the coupling mechanism 28.

The relative positions of the footwear upper 42 and affixed welt 44 mounted on the peripheral edge of the sole forming last 12 and of the ring mold 14 attached around the last peripheral edge with the welt exterior edge 58 extending into the ring mold grooves 36, 38, are shown in FIG. 3. In the assembled relative positions of the upper, welt, sole forming last and ring mold shown in FIG. 3, the novel steps involved in constructing a composite sole having a molded midsole and an outsole adhered thereto according to the method of the invention are ready to proceed. The steps of the method of the invention described to this point in constructing footwear are substantially the same as those practiced in prior art methods of footwear construction.

As described earlier and as briefly recounted here, the prior art method of constructing a complete rubber outsole to the footwear upper would next involve inserting an insole (not shown) into the ring mold interior 62 shown in FIG. 3 and positioning the insole on the sole forming surface 16 of the last 12. The insole is frequently constructed of a piece of fiberboard that has a narrow thickness and a periphery dimensioned to the configuration of the upper interior defined by the welt. A shankpiece is also frequently adhered to the bottom surface of the insole which, given the orientation shown in FIG. 3, would be positioned over the insole inserted into the ring mold. One or more pieces of raw rubber are then inserted into the ring mold interior 62 on top of the insole and shankpiece and then a vulcanizing piston (not shown) is inserted into the interior 62. The piston compresses the pieces of rubber and the insole between the piston face and the sole forming surface 16 of the last. The piston is heated in a process that vulcanizes the piece of rubber into a complete sole formed on the welt surrounding the sole forming surface 16 of the last and the portion of the upper peripheral edge secured to the welt. In the prior art process, the piston face has a specific configuration designed to form a traction surface on the bottom surface of the sole being formed to the welt and upper. Because the entire footwear sole is being formed to the welt, a substantial amount of raw rubber is vulcanized by the piston often requiring heating the piston to a temperature of 410° F. for a time period of 17 minutes or more. When the vulcanizing time period has elapsed, the piston is removed from the ring mold and the ring mold is removed from around the shoe forming last and the complete sole formed on the welt and shoe upper. The completed shoe, having the complete sole formed to the welt and upper, is then removed from the last.

In forming a composite sole on the footwear upper according to the method of the invention, an insole is not initially inserted into the ring mold and placed on the last. Instead, raw rubber is inserted into the ring mold interior 62 and placed on the sole forming surface 16 of the last. However, because according to the method of the invention only a midsole is molded onto the periphery of the upper 44 and the welt 48, a substantially less amount of raw rubber need be inserted into the ring mold interior 62 than the amount of rubber required in forming the entire sole to the shoe upper according to the prior art method of construction. Additionally, because a lesser amount of raw rubber is employed in forming the midsole on the upper according to the method of the invention, the time required in vulcanizing the raw rubber to the upper and the temperature required to heat the piston employed in the vulcanization process according to the method of the invention are both less than the time and heat, respectively, associated with the prior art process of forming an entire sole to a shoe upper.

FIG. 4 shows a first piece of raw rubber 64 inserted into the ring mold interior 62 in the initial step of forming the midsole according to the method of the invention. This first piece of raw rubber 64 covers substantially the entire sole forming surface 16 of the last 12. If so desired, the raw rubber initially inserted into the ring mold interior 62 may be comprised of several pieces of raw rubber placed on the sole forming surface. The only criteria at this point in forming the midsole according to the method of the invention is that the amount of raw rubber placed on the sole forming surface 16 be sufficient to fill the area bounded by the sole forming surface and the welt 48 stretched around the periphery of the surface, and a plane which will extend through the midsole formed on the upper, in which plane a shankpiece 66 to be encapsulated in the midsole will be positioned.

Also shown in FIG. 4, once these initial piece or pieces of raw rubber 64 are inserted into the ring mold interior 62 the shankpiece 66 to be encapsulated in the midsole formed according to the method of the invention is placed on the raw rubber. Following insertion of the shankpiece 66, an additional piece or pieces of raw rubber 68 are then placed into the ring mold interior 62 on top of the shankpiece. The total amount of raw rubber inserted into the ring mold interior 62 including the first piece or pieces 64 of raw rubber and the second piece or pieces 68 of raw rubber is determined to form the complete midsole when the total number of pieces of rubber are vulcanized into the unitary midsole encapsulating the shankpiece 66 according to the method of the invention.

After placement of the raw rubber pieces 64, 68 and the shankpiece 66 into the ring mold interior 62, a vulcanizing piston 72 is moved downwardly into the ring mold interior 62. Because a lesser amount of rubber is employed in forming the composite midsole according to the method of the invention than the amount of rubber employed in forming an entire sole to an upper according to the prior art method of construction, the vulcanizing piston 72 is moved downwardly into the ring mold interior 62 to a greater depth than the vulcanizing piston employed in the prior art method of forming a complete sole to a shoe upper. In the improved method of the invention, the piston is heated to a lesser temperature than in the prior art method, in one example the piston is heated to only 375° Farenheit, and the piston is heated for a lesser time period than the prior art process, in one example the piston is only heated for 4½ to 5 minutes to complete the vulcanization process of the midsole. The vulcanizing piston 72 of the present invention further differs from the vulcanizing piston of the prior art by having a substantially flat, smooth face surface 74. The flat face surface 74 forms a flat surface 76 on the blank midsole 78 affixed to the welt 48 and peripheral edge 44 of the upper during the vulcanization process of the method of the invention. During vulcanization, the pieces of raw rubber 64, 68 compressed between the piston face surface 74 and the sole forming surface 16 of the last are transformed into a solid, unitary rubber midsole 78 having the shankpiece 66 encapsulated therein.

Following the formation of the midsole 78 by the vulcanization process, the vulcanizing piston 72 is retracted from the ring mold interior 62 and the ring mold is disassembled from around the midsole 78 and the sole forming last 12. Following removal of the ring mold, the footwear upper 42, with the midsole 78 affixed to the welt 48 and the bottom peripheral edge 44 of the upper, are removed from the sole forming last 12. The periphery of the midsole 78 is then trimmed so that its surface is substantially flush to the exterior edge 58 of the welt. If so desired, an insole may also be adhered to the top surface of the midsole inside the upper interior. A selected outsole 82 is then adhered to the flat surface 76 of the midsole completing the construction of the composite sole to the footwear. The outsole 82 has a substantially flat top surface 84 complementary to the flat surface 76 of the midsole to facilitate adhering the outsole to the midsole. The bottom surface 86 of the outsole is provided with any one of a variety of different traction surfaces, for example a slip resistant surface, a wear resistant surface, or an electrostatic dissipating surface as well as other traction surfaces available. In this manner, the process of forming a composite sole to the upper of footwear according to the method of the invention may be employed in producing footwear having a variety of different traction surfaces on the outsole.

While the present invention has been described by reference to a specific embodiment, it should be understood that modifications and variations of the invention may be constructed without departing from the scope of the invention defined in the following claims.

What is claimed is:

1. A method of constructing footwear with an upper and a composite sole including a blank midsole and an outsole having a desired traction surface thereon, the method comprising the steps of:

constructing the upper from a flexible material with a bottom of the upper having a peripheral edge portion;

positioning the upper on a last with the peripheral edge portion surrounding the last;

surrounding the last and the peripheral edge portion of the upper with a ring mold;

placing rubber into the ring mold and on the last;

inserting a piston having a flat piston face into the ring mold compressing the rubber between the last and the piston face;

heating the piston and vulcanizing the rubber compressed between the last and the piston face, forming the rubber into a midsole affixed to the peripheral edge portion of the upper and having a flat bottom surface;

removing the piston from the ring mold and removing the ring mold from around the last and the peripheral edge portion of the upper;

removing the upper and the midsole affixed to the peripheral edge portion of the upper from the last; and, adhering an outsole having a desired traction surface and a flat top surface to the midsole with the midsole bottom surface adhered to the outsole top surface.

2. The method of claim 1, further comprising:

constructing the upper of leather.

3. The method of claim 1, further comprising:

placing a shankpiece into the ring mold with the rubber placed in the ring mold and on the last.

4. The method of claim 3, further comprising:

placing a first piece of rubber into the ring mold and on the last, then placing the shankpiece into the ring mold and on the first piece of rubber, then placing a second piece of rubber into the ring mold and onto the shankpiece.

5. The method of claim 1, further comprising:

adhering an outsole having a desired traction surface to the midsole where the desired traction surface is selected from outsoles having wear resistant surfaces, slip resistant surfaces, and static electricity resistant surfaces.

6. The method of claim 1, further comprising:

after removing the upper and the midsole affixed to the peripheral edge portion of the upper from the last, positioning an insole inside the upper and on the midsole affixed to the peripheral edge portion of the upper.

7. The method of claim 1, further comprising:

prior to positioning the upper on the last, affixing a welt to the peripheral edge portion of the upper and then positioning the upper with the affixed welt on the last with the peripheral edge portion and the welt surrounding the last.

8. The method of claim 1, wherein the step of surrounding the last and the peripheral edge portion of the upper with a ring mold separates a remainder of the upper, other than the peripheral edge portion of the upper, from the heat of the piston when vulcanizing the rubber compressed between the last and piston face.

9. The method of claim 3, further comprising:

positioning the shankpiece in the ring mold relative to the rubber placed in the ring mold to completely encapsulate the shankpiece in the rubber when heating the piston and vulcanizing the rubber compressed between the last and the piston face.

10. A method of constructing footwear with an upper and a composite sole including a blank midsole and a selected outsole from a variety of different outsoles, the method comprising the steps of:

constructing an upper for the footwear with an interior surface and an exterior surface and a bottom peripheral edge that is configured to be secured to the composite sole;

securing a welt to the bottom peripheral edge of the upper by positioning the welt against the exterior surface of the upper and adjacent the peripheral edge of the upper and then stitching the welt to the exterior surface of the upper around the peripheral edge of the upper;

positioning the upper and welt on a sole forming last with the upper peripheral edge and the welt extending around a sole forming surface of the last;

closing a ring mold around the last and the upper peripheral edge and welt positioned on the last, the ring mold having an interior surface that surrounds the last and extends uprightly relative to the sole forming surface of the last, the ring mold interior surface having a groove therein and a portion of the welt being positioned in the groove to thereby position an other portion of the welt and the bottom peripheral edge of the upper over the sole forming surface of the last;

positioning at least a pair of pieces of rubber into the ring mold and on top of the sole forming surface of the last and positioning a shankpiece between the pair of pieces of rubber;

inserting a piston having a flat face surface into the ring mold where the face surface of the piston compresses the pieces of rubber and the shankpiece between the sole forming surface of the last and the face surface of the piston, then heating the piston and vulcanizing the pieces of rubber and forming the pieces of rubber into a unitary midsole secured to the welt and the bottom peripheral edge of the upper with the midsole encapsulating the shankpiece and having a flat bottom surface with a configuration complementary to the face surface of the piston;

removing the piston from the ring mold and removing the ring mold from around the last and the upper peripheral edge and welt positioned on the last;

removing the welt and bottom peripheral edge of the upper and the midsole secured thereto from the last; and, adhering a selected outsole having a desired traction surface configuration to the bottom surface of the midsole thereby completing construction of the composite sole to the footwear.

11. The method of claim 10, further comprising:

constructing the upper from leather.

12. The method of claim 10, wherein the step of closing the ring mold separates a remainder of the upper, other than the bottom peripheral edge of the upper, from the heat of the piston and the heat of vulcanizing the pieces of rubber while forming the pieces of rubber into the unitary midsole secured to the welt and the bottom peripheral edge of the upper.

13. The method of claim 10, further comprising:

after removing the welt and bottom peripheral edge of the upper and the midsole secured thereto from the last, inserting an insole into the upper and positioning the insole on the midsole.

\* \* \* \* \*